Patented Dec. 8, 1953

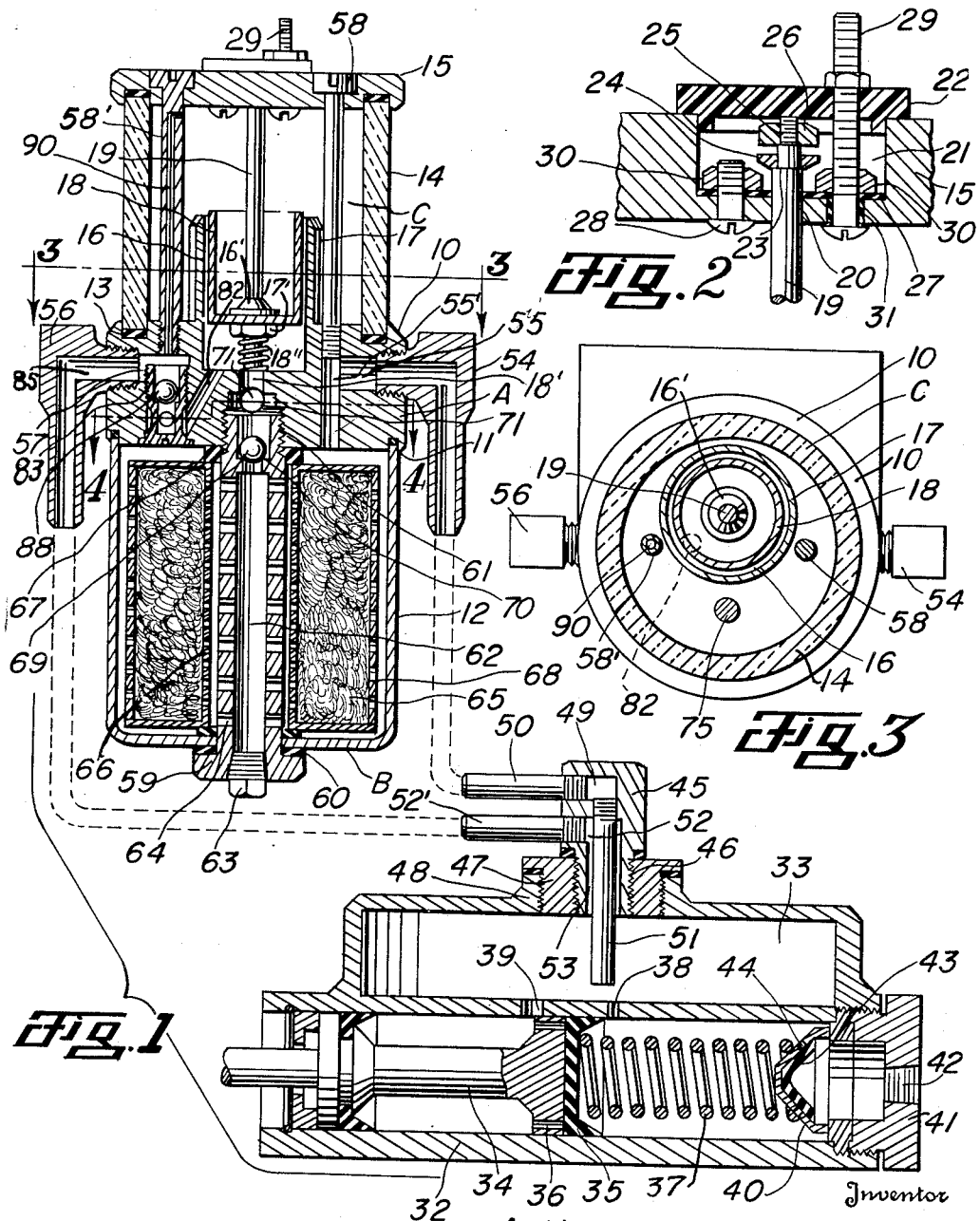

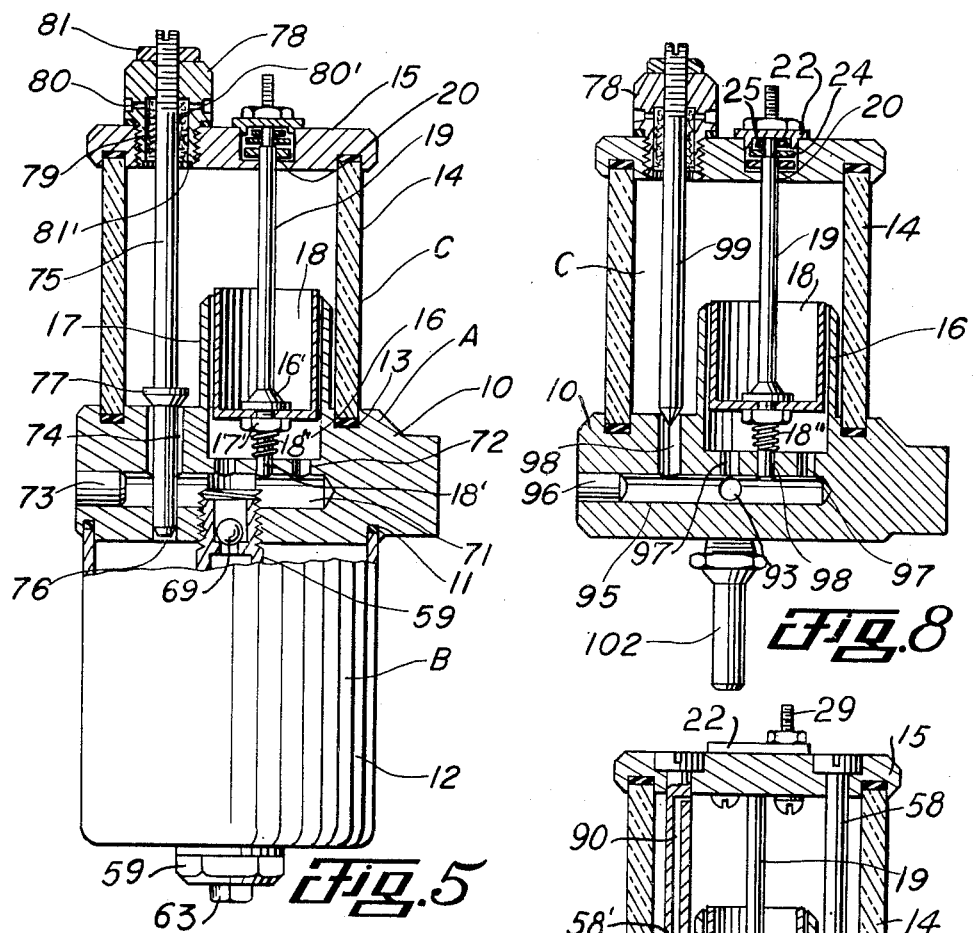
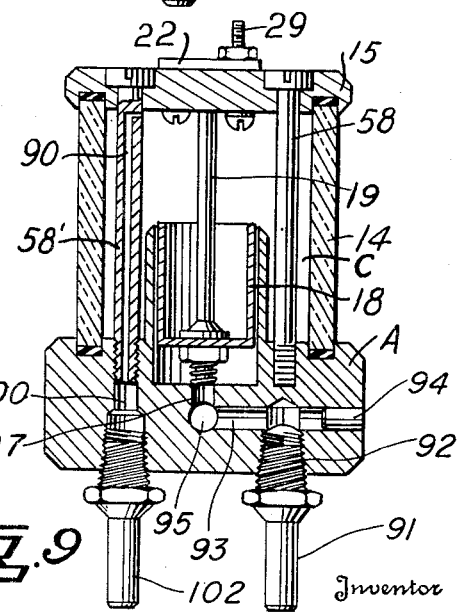
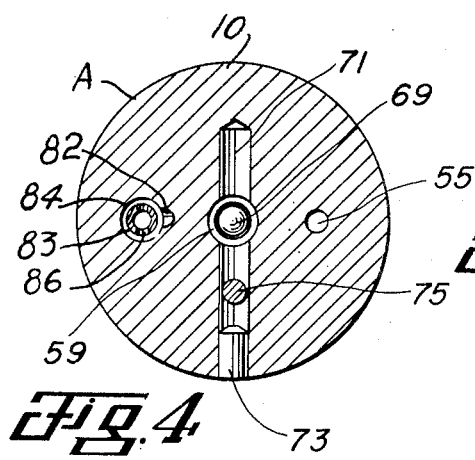

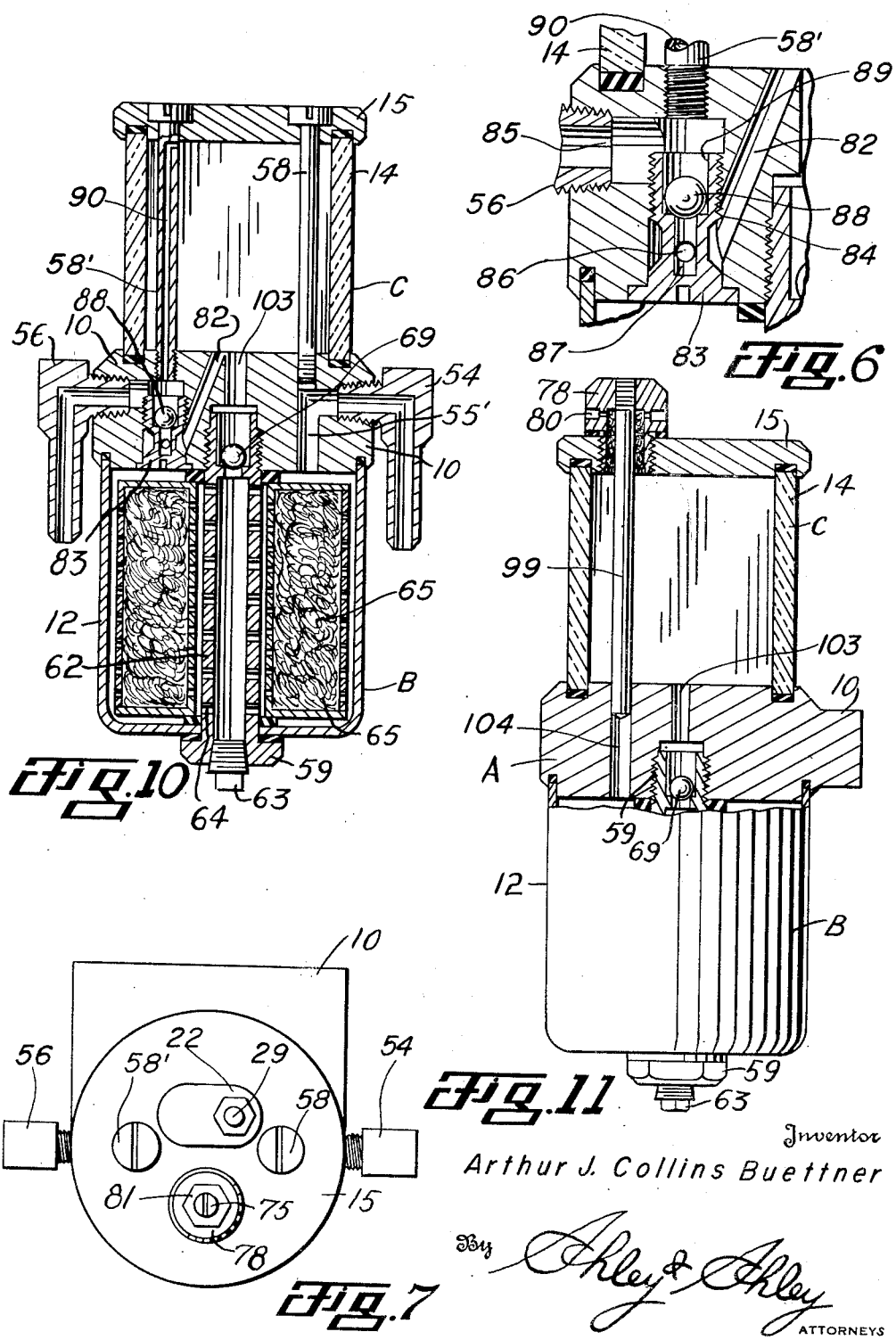

2,661,847

UNITED STATES PATENT OFFICE 2,661,847

BRAKE SYSTEM FILTER AND INDICATOR

Arthur J. Collins Buettner, Dallas, Tex.

Application September 23, 1950, Serial No. 186,462

4 Claims. (Cl. 210—166)

This invention relates to new and useful improvements in brake fluid filtering devices.

One object of the invention is to provide an improved brake fluid filter having liquid-actuated means for closing an electrical circuit to a signal, together with a by-pass arrangement, whereby a sensitivity may be provided which will allow the desired actuations of the signal.

Another object of the invention is to provide an improved filter having means for exhausting air therefrom so as to provide efficient fluid actuation, together with a filter whereby dirt and the like is kept from the vital parts of the device.

A further object of the invention is to provide an improved brake fluid filter wherein the master cylinder is maintained full of fluid and whereby road dust and water are excluded to the fullest extent.

Another object of the invention is to provide an improved brake fluid filter wherein an electrical signal is actuated by a piston which is so arranged as to close the circuit upon descent and thus given an operative signal, together with adjustable means for by-passing a portion of the fluid, whereby a desired actuation of the piston is obtained.

A still further object of the invention is to provide an improved brake fluid device which continuously filters the brake fluid, which provides a brake fluid reservoir, and which gives a warning signal when the brake fluid is low.

An important object of the invention is to provide an improved brake fluid device responsive to small movements of the brake fluid to give a momentary warning signal to indicate the warning system is operative, wherein an adjustable by-pass is provided to permit regulation of the sensitivity of the indicating arrangement.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a transverse, vertical, sectional view of a brake fluid filtering mechanism constructed in accordance with the invention, Fig. 2 is a sectional detail view of the electrical switch, Fig. 3 is a horizontal, cross-sectional view of the filter taken on the line 3—3 of Fig. 1, Fig. 4 is a horizontal, cross-sectional detail view, taken on the line 4—4 of Fig. 1, Fig. 5 is a transverse, vertical, sectional view, taken at a right angle to Fig. 1, Fig. 6 is an enlarged, sectional view of the return flow bushing, Fig. 7 is a plan view of the filter, Fig. 8 is a transverse, vertical, sectional view of a modified form of the device wherein the filter is omitted, Fig. 9 is a transverse, vertical, sectional view, taken at a right angle to Fig. 8, Fig. 10 is a transverse, vertical, sectional view of another modification wherein the well and piston are omitted, and Fig. 11 is a transverse, vertical, sectional view, taken at a right angle to Fig. 10.

In the drawings, the numeral 10 designates a manifold body or block, which is preferably cylindrical in shape and comparatively short vertically so as to have a flat disk form. The body has a marginal groove 11 in its underside and the upper annular edge of a depending bowl or cup 12 is suitably sealed in said groove. In the upper side or top of the body, an annular groove 13 is formed at the margin and a glass or transparent cylinder or container 14 has its lower annular edge sealed in this groove. The cylinder is closed at its top by a cap 15 having a marginal groove in its bottom, in which the upper end of the cylinder is suitably sealed. From the foregoing it will be seen that the brake fluid indicator comprises, in its preferred form, three main elements which may be referred to as a block A, a bowl B depending from and sealed to the bottom of the block and a transparent surge vessel C mounted on and sealed to the upper side of said block.

At the central portion of the block A is a cylindrical well 16 which is continued upwardly and confined by a cylindrical wall 17 disposed within and spaced from the cylinder 14. Within the well and slightly spaced from the wall thereof is a cylindrical cup-shaped piston 18. The piston is fastened on an upright rod 19 near the lower end thereof. The lower end of the rod has a free sliding fit in an aperture 18' in the bottom of well 16. The upper end of the rod has a sliding fit in an aperture 20 (Fig. 2) in the bottom of the cap 15. The piston is fastened on the rod between a stop 16' and a nut 17' which rests upon a coiled spring 18" surrounding the rod, whereby the piston and rod are yieldably held in position. By this arrangement the piston is centered in the well and maintains a narrow, annular upright space between the outer surface of the piston and the inner surface of the well.

The function of the piston 18 is to actuate an electric switch which is illustrated in detail in Fig. 2. The cap 15 is preferably made of metal and has a central recess 21 in its upper surface into which the upper end of the rod 19 extends. This recess is closed by a cover 22 of electrical insulating material fitting into the top thereof. The upper end of the rod is reduced to form a shoulder 23 and to receive an annular contact ring 24 having its under edge beveled. The extreme upper end of the rod is again reduced and screw-threaded at 25 to receive a nut 26. There is a space between the shoulder 23 and the nut and the ring 24 has a loose fit on the rod so as to have freedom to undergo a limited sliding and tilting movement.

The bottom of the recess 21 has a strip of mica or other electrical insulating material 27 thereon. A pair of inverted, contact screws 28 and 29 extend through the bottom of the recess on each side of the rod 19. A pair of beveled, annular contact nuts 30 are mounted on the screws and tightened down onto the strip 27 in position so that their bevels may be engaged by the undercut bevel of the ring 24, whereby an electrical circuit is closed. The screw 29 is insulated from the cap 15 by a flanged sleeve 31 extending through the bottom of the cap and this screw 29 extends up through and above the cover 22 so that an electrical circuit wire may be attached thereto. The other circuit wire (not shown) may be attached to the metal cap 15. So long as the piston 18 is elevated by a proper body of fluid in the well 16 and vessel C, the contact ring 24 will be held above and out of contact with the contact nuts 30, and an open electrical circuit thus maintained.

The braking mechanism includes the conventional master brake-fluid cylinder 32 with a surge chamber 33 mounted thereon. A piston 34 is slidably mounted in the cylinder 32 and has an elastic packing cup 35 on its head 36 for receiving one end of a coiled spring 37 and is adapted to coact with ports 38 and 39 extending between the cylinder and the surge chamber. A floating valve head 40 is confined between the outer end of the spring 37 and a seat ring 41 secured in the outlet end of the cylinder, which latter has a port 42 adapted to be connected with the conduits of the brake system (not shown). The valve head 40 is generally frusto-conical in form and has an elastic cup 43 filling the contour of its inner conical surface. Ports 44 in the conical portion of the head are normally covered by the cup 43.

When the piston 34 is moved outwardly or toward the right (Fig. 1) to apply the brakes, the piston forces the brake fluid through the ports 44 and 42 into the braking system (not shown) and the brakes are applied. During this movement of the piston, the piston cup 35 passes under and closes off the port 38 and the piston head 36 fully uncovers the port 39. Manifestly, a portion of the fluid within the cylinder head of the cup 35 is forced by the movement of the piston through the port 38 into the chamber 33, thereby causing a slight surge or movement of the fluid in said chamber. Upon release of the brakes and reverse movement of the piston, the fluid previously forced into the chamber reenters the cylinder through the port 38 so as to again create a movement of the fluid within said chamber.

Communication between the block A of the filter device and the chamber 33 is established through a head 45 having a screw-threaded pin 46 at its lower end screwed into a flanged bushing 47 which in turn is screwed into an internally screw-threaded boss 48 on top of the chamber 33. Both the head and bushing are sealed so as to be exteriorly fluid tight. The head has a lateral outlet port 49 in its upper end into which is screwed an outlet nipple 50. An outlet tube 51 has its upper end screwed into the head so as to communicate with the port 49, and has its lower end terminating just above the bottom of the chamber 33 so that its lower end, under normal conditions, is constantly submerged in the brake fluid which fills the chamber. Below the port 49 an inlet port 52 receives an inlet nipple 52' and opens into an upright passage 53, surrounding the tube 51. The passage is open at its bottom so as to communicate with the upper portion of the chamber 33.

An angular inlet nipple or elbow 54 has its upper lateral branch screw-threaded into an inlet port 55 at one side of the block A, while a similar outlet nipple or elbow 56 is screwed into an outlet port 57 in the opposite side of the head. The nipple 54 is suitably connected by a conduit with the outlet nipple 50, while the nipple 56 is similarly connected with the inlet nipple 52'. The connection conduits are indicated in dotted lines in Fig. 1. The inlet port 55 opens into an upright passage 55' which opens downwardly into the bowl B. The cap 15 is held on the cylinder 14 by a pair of screw bolts 58 and 58', the lower end of the bolt 58 being screwed into the top of the passage 55' on one side of the well 16 and the lower end of the bolt 58' being screwed into the block on the opposite side of said well.

The bowl B is held in place by a tubular bolt 59 having its head at the bottom for supporting a packing washer 60 which in turn supports said bowl. The upper end of the bolt is reduced and screwed into a port 61 in the bottom of the block and at the center thereof. An axial bore 62, the lower end of which is closed by a screw plug 63, is formed in the bolt 59 and perforations 64 extend through the wall of the bolt to the bore. A cylindrical filter cartridge 65 has a perforated core 66 loosely surrounding the bolt and resting on a packing washer at the bottom of the bowl. An upper packing washer 67 surrounds the bolt 59 and packs off between the top of the cartridge and the bottom of the block. The cartridge is filled with suitable filtering material and has an external, perforated, cylindrical wall 68 which is slightly spaced from the wall of the bowl.

The brake fluid flows from the passage 55' down into the bowl and enters the cartridge through the perforation of its outer wall 68. This fluid flows through the filter and out at the center through the perforated core 66 and into the bore 62 of the bolt 59 through the perforations 64. The brake fluid, rising in the bore 62, unseats and flows past a ball check valve 69 resting on a seat 70 formed in the bore of the bolt a short distance below the upper end thereof. The upper end of the bore 62 discharges into a transverse manifold passage 71 in the block which communicates with the well 16 through ports 72 in its bottom (Fig. 5). The passage 71 is closed at its outer end by a plug 73.

A relief and filling bore 74 extends from the manifold passage 71 upwardly through the block A so as to open into the vessel C. A rod 75 extends down through the vessel C, through the bore 74, across the passage 71 (Fig. 5) and has a snug fit in a bore 76 which extends through the bottom of the block from the passage 71 into the bowl B. The bore 74 is somewhat larger than the rod and a valve head 77 surrounding the rod is adapted to seat in the top of said bore and close off the same. The upper end of the rod extends through a plug 78 screwed into the cap 15. This plug has an axial bore 79 surrounding and spaced from the rod with outlet ports 80 leading from the upper end of the bore through the plug to the atmosphere and forming vents for the top of the vessel C. The bore 79 around the rod is filled with filtering material 80'. The upper end of the rod 75 is screw-threaded in the upper end of the plug and a jamb nut 81 engaged on the upper projecting end of the rod engages the top flat surface of said plug and fastens the rod in adjusted positions.

An outlet from the bottom of the well 16 is provided by an inclined duct 82 leading down through the block A to a spool-shaped plug 83 (Figs. 1 and 6) having its upper end screwed into a screw-threaded vertical bore 84 extending from the bottom of the block up to a lateral passage 85 leading to the port 57 into which the outlet nipple 56 is screwed. The plug 83 has a lateral inlet port 86 exposed to the duct 82 and opening into the lower portion of a well 87 formed in the plug. The upper end of the plug has an enlarged bore 89 for housing a valve ball 88 which seats upon and closes the upper end of the well 87. This valve ball acts as a check to prevent a reverse flow down through the well 87 and through the duct 82 to the well 16. The bolt 58' has its lower end exposed to the passage 85 and has an axial bore 90 leading from the passage 85 to the surge vessel C above the fluid level therein.

The brake fluid level is carried in the cylinder 14 a short distance below the cap 15 and under normal conditions the vessel below said level, the passages of the block, the bowl B, the chamber 33 and its connections with the block and the cylinder 32, are all filled with brake fluid. When it is necessary to add fluid, the rod 75 and plug 78 are removed and the opening in the cap 15, normally closed by said plug, is used to introduce fluid. Such fluid would originally flow by gravity down through the bore 74 into the passage 71 and through the bore 76 into the bowl B. After filling the bowl, the fluid enters the filter cartridge 65 through the perforations of the wall 68 and after flowing through the filter escapes through the ports of the core 66 and passes through the perforations 64 of the bolt 59 into the bore 62 thereof. Any accumulated air will be forced upwardly past the valve ball 69. The fluid from the bowl will pass out through the passage 55' to the port 55 and thence by way of the elements 54, 50, 49 and 51 into the chamber 33.

The tube 51 extends deep into the chamber 33 so that fluid is always discharged into the lower portion of the chamber. Air will flow out of the chamber 33, through passage 53, nipple 52' to the nipple 56 into the passage 85 and thence through the bore 90 of the bolt 58', from which it escapes into the top of vessel C. Air escapes from the vessel into the bore 79 of the plug 78 and to the atmosphere through the ports 80. It is pointed out that the complete structure hereinbefore described is subject to variation. In Figs. 8 and 9, a modification is illustrated wherein the bowl B is omitted; while in Figs. 10 and 11, another modification is set forth, wherein the block A and bowl B are employed, and vessel C is used without the well 16 and cylindrical wall 17.

In Figs. 8 and 9, the nipples 54 and 56 are not employed. Instead of the angular nipple 54, a straight nipple 91 is adapted to be connected to the outlet nipple 50 and is screwed into a threaded port 92 in the bottom of the block A which takes the place of the passage 55' and discharges into a transverse passage 93 which is sealed at its outer end by a plug 94. The passage 93 bisects a duct 95 which is closed at outer end by a plug 96. From the duct, two ports 97 extend to the bottom of the well 16, similar to the ports 72 in Fig. 5. Also, a port 98 extends from the duct up through the block, similar to the bore 74.

A rod 99, similar to the rod 75, has its lower end bevelled and adapted to seat in and close off the upper end of the port 98. The bolt 58' with its vent line 90 is used, but the lower end of the bolt is screwed into an upright bore 100 which extends through the block and has its lower end enlarged and screw-threaded to receive a nipple 102, similar to the nipple 91. The nipple 102 is adapted to be attached to the nipple 52' of Fig. 1. This form functions, with the exception of the filter, similarly to the form shown in Figs. 1 and 7, inclusive. The fluid movement from the chamber 33 is through the nipples 50 and 91 into the passage 93, thence through the duct 95 and ports 97 into the well 16 and also through the bore 100 into the vessel C. Since the filter is not employed, there may be no fluid drained back through bore 100 and nipples 102 and 52'.

In the form shown in Figs. 10 and 11, the well 16 and the piston 18 are omitted and also the passages in the block 10 are changed; however, the same reference numerals will be used to designate the same elements shown in Figs. 1 through 9. The difference will become apparent by comparing Fig. 10 with Fig. 5. The manifold passage 71 is not employed, but the filter 65 is employed so that the liquid after unseating the valve 69 and flowing through the upper end of the hollow bolt 59, discharges into a reduced port 103 which leads up through the center of the block into the vessel C. The rod 99 shown in Fig. 8 is employed, and closes a filling port 104 which leads down through the block and discharges into the bowl B. As shown in Fig. 10, the return duct 82, plug 83, and other structural elements illustrated in Figs. 6, are also employed in the last form of the invention.

In the operation of the device, each time the brake pedal of the automobile is actuated, fluid is caused to flow, as brought out hereinbefore, upwardly through the nipples 50 and 54 into the passage 55. It is obvious that such flow of the fluid through the nipples 52' and 56 is prevented by means of the check valve 88. The brake fluid thus flows into and through the filter upon the downward stroke of the brake pedal, and accumulates within the reservoir chamber C. As the brake pedal is released, the fluid returns into the cylinder 32 and hence brake fluid is drawn from the reservoir C. Here again, the check valve 69 prevents reverse flow, and the return flow of the brake fluid therefore must take place through the nipples 56 and 52'. It will be seen that the vessel C also forms a surge vessel which is necessary when the surge chamber 33 is full of fluid.

With this arrangement, each time the brake pedal is actuated, a small flow of the brake fluid through the filter cartridge is created, and in this manner, a continuous filtering of the brake fluid is obtained. It is obvious that the brake fluid is thus kept in much better condition and is maintained free of dirt and other foreign material.

The provision of the by-pass valve 77 is important since it is desirable that the piston or float member 18 be actuated each time the brake pedal is depressed and released. This momentary actuation of the piston 18 upon each actuation of the brake pedal, causes a momentary closing of the electrical warning circuit and hence the flashing momentarily of the warning light which is disposed within the driver's compartment and the operation of which is controlled by the contact ring 24. This actuation of the warning light each time the brake pedal is operated serves to notify the operator of the vehicle that the warning system is operative, and imparts the information that the warning system may be relied upon for indicating a low supply of brake fluid.

It is noted that the piston 18 has a relatively close fit within the retaining wall 16 so that a small annular flow space is provided therebetween. The function of this restricted flow space is to permit some fluid to pass therethrough. Since the spring 18'' supports the piston and holds it elevated, whereby the upper end of the rod 19 will engage the cover 22 (Fig. 2), there will be no permanent downward movement of the piston until the liquid level in the vessel C is lowered below the top of the piston 18 sufficiently to permit the liquid load in the piston to overcome the spring 18'. This downward movement of the piston lowers the rod 18 sufficiently to bring the ring 24 (Fig. 2) into engagement with the contact nuts 30, thereby closing the signal circuit. However, when the brake pedal is released and the fluid returned to the surge chamber 33, there is a corresponding downward flow of brake fluid through the small annular space surrounding the piston 18, and this downward flow causes the piston 18 to move momentarily downwardly so as to close the electrical contacts and flash the warning light. Ordinary manufacturing tolerances are such that the annular space surrounding the piston 18 cannot readily be critically set, and in various commercial models of the device, the actual cross-sectional area of such annular space may vary to some extent. It is obvious that if the space is too small, the device will be extremely sensitive and will not perform properly. On the other hand, if the annular space is too large, the device will not have the necessary sensitivity and will not give the desired indications of continued operativeness.

The bypass valve 77 has therefore been provided, and it is pointed out that a portion of the flow of brake fluid upwardly into this device occurs through the ports 72, and a portion through the passage 74. By adjusting the vertical elevation of the rod 75, the valve head 77 is moved into or out of the upper portion of the bore 74 so as to restrict or open said bore and hence to proportion the quantity of flow of the brake fluid passing through the ports 72. In this manner, the quantity of such fluid passing upwardly through the annular space surrounding the piston 18 may be varied by adjustment of the valve head 77, and the desired sensitivity of operation obtained. Indeed, over extended periods of use, the operating characteristics of the piston 18 might possibly change to some extent, although this is to be doubted, and in such event, readjustment of the valve head 77 within the passage 74 by means of the jamb nut 81 again restores to the device the desired degree of sensitivity and provides for momentary actuation of the piston 18 and momentary closing of the electrical contacts upon the desired degree of movement of the brake pedal. It is obvious that the valve rod 99 may similarly be adjusted within the passage 93 to provide for proper sensitivity of the forms of the invention shown in Figs. 8 and 9.

It is to be understood that whenever the liquid in the system is depleted to such a point that it will not rise high enough in the vessel C to offset the weight of the liquid-loaded piston 18, then the contacts 24 and 30 will remain in engagement and the signal circuit will remain closed.

It is to be understood that the electrical elements are connected with a suitably arranged and located warning lamp or other signal. The contact screw 29 is connected with one side of the signal circuit (not shown) while the cap 15 is connected with the other side of said circuit.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A brake fluid filtering device adapted for use with hydraulic brake systems having a master cylinder and a surge chamber in communication with said cylinder, the filtering device including, a supporting block, a surge vessel carried by the block, an inlet conductor adapted to be connected to the surge chamber of the brake system and having connection through the block with the surge vessel, a check valve between the inlet conductor and the surge vessel preventing flow from the vessel to the conductor, a filter between the inlet conductor and the surge vessel, an outlet conductor adapted to be connected to the surge chamber of the brake system and having connection through the block with the surge vessel, and a check valve between the surge vessel and the outlet conductor preventing flow from the outlet conductor to the surge vessel.

2. A brake fluid filtering device as set forth in claim 1, and a filter bowl depending from the block, the filter being disposed in said bowl, and the block and bowl having passages leading from the inlet conductor to the surge vessel.

3. A brake fluid filtering device as set forth in claim 2, wherein the surge vessel has a filling opening therein for the addition of brake fluid, the block having a port leading from the surge vessel to the filter bowl, and a removable closure engaged in the latter port.

4. A brake fluid filtering device as set forth in claim 1, and an air vent leading from the outlet conductor to the surge vessel.

ARTHUR J. COLLINS BUETTNER.

References Cited in the file of this patent

UNITED STATES PATENTS

| Number | Name | Date |
|---|---|---|
| 1,632,773 | Bijur | June 14, 1927 |
| 2,085,173 | Stansbury | June 29, 1937 |
| 2,253,260 | Alcorn | Aug. 19, 1941 |
| 2,447,142 | Smith et al. | Aug. 17, 1948 |
| 2,494,802 | Fox | Jan. 17, 1950 |

FOREIGN PATENTS

| Number | Country | Date |
|---|---|---|
| 495,751 | Great Britain | Nov. 18, 1938 |